US010003606B2

(12) United States Patent
Roundy et al.

(10) Patent No.: US 10,003,606 B2
(45) Date of Patent: Jun. 19, 2018

(54) SYSTEMS AND METHODS FOR DETECTING SECURITY THREATS

(71) Applicant: Symantec Corporation, Mountain View, CA (US)

(72) Inventors: Kevin Alejandro Roundy, El Segundo, CA (US); Michael Hart, Farmington, CT (US); Christopher Gates, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 199 days.

(21) Appl. No.: 15/084,522

(22) Filed: Mar. 30, 2016

(65) Prior Publication Data

US 2017/0289178 A1    Oct. 5, 2017

(51) Int. Cl.
| G06F 11/00 | (2006.01) |
| H04L 29/06 | (2006.01) |
| G06F 21/55 | (2013.01) |

(52) U.S. Cl.
CPC ........ *H04L 63/1416* (2013.01); *G06F 21/554* (2013.01); *H04L 63/1425* (2013.01); *G06F 2201/86* (2013.01)

(58) Field of Classification Search
CPC ............. H04L 63/1416; H04L 63/1425; G06F 21/554; G06F 2201/86
USPC .......................................................... 726/23
See application file for complete search history.

(56) References Cited

U.S. PATENT DOCUMENTS

| 7,352,280 | B1 | 4/2008 | Rockwood |
| 8,214,905 | B1 | 7/2012 | Doukhvalov et al. |
| 8,839,435 | B1 * | 9/2014 | King ................... H04L 63/1425 726/22 |
| 9,098,706 | B1 | 8/2015 | Kennedy |
| 9,270,467 | B1 | 2/2016 | Chen et al. |
| 9,413,780 | B1 | 8/2016 | Kaplan et al. |
| 9,485,272 | B1 | 11/2016 | Roundy |
| 9,792,169 | B2 * | 10/2017 | Seigel ................... G06F 11/079 |
| 9,838,405 | B1 | 12/2017 | Guo et al. |

(Continued)

OTHER PUBLICATIONS

Kevin Roundy, et al.; Systems and Methods for Identifying Non-Malicious Files on Computing Devices Within Organizations; U.S. Appl. No. 14/750,342, filed Jun. 25, 2015.

(Continued)

*Primary Examiner* — Mohammad W Reza
(74) *Attorney, Agent, or Firm* — FisherBroyles, LLP

(57) ABSTRACT

The disclosed computer-implemented method for detecting security threats may include (1) detecting, by a software security program, a security incident at a client device such that the software security program generates a signature report to identify the security incident, (2) querying an association database with the signature report to deduce another signature report that a different software security program would have predictably generated at the client device, the different software security program having been unavailable at the client device at a time of detecting the security incident, and (3) performing at least one protective action to protect the client device from a security threat associated with the security incident based on the other signature report deduced by querying the association database. Various other methods, systems, and computer-readable media are also disclosed.

20 Claims, 6 Drawing Sheets

(56) References Cited

U.S. PATENT DOCUMENTS

| | | |
|---|---|---|
| 2002/0083070 A1 | 6/2002 | Shuster |
| 2005/0283837 A1 | 12/2005 | Olivier et al. |
| 2006/0230451 A1 | 10/2006 | Kramer et al. |
| 2006/0242712 A1 | 10/2006 | Linn et al. |
| 2006/0253548 A1 | 11/2006 | Vitanov et al. |
| 2007/0240217 A1 | 10/2007 | Tuvell et al. |
| 2008/0086772 A1 | 4/2008 | Chesla |
| 2009/0089290 A1 | 4/2009 | Nachenberg et al. |
| 2009/0217370 A1 | 8/2009 | Hulten et al. |
| 2010/0083376 A1 | 4/2010 | Pereira et al. |
| 2010/0228852 A1 | 9/2010 | Gemelos et al. |
| 2012/0233698 A1 | 9/2012 | Watters et al. |
| 2013/0074143 A1 | 3/2013 | Bu et al. |
| 2014/0096246 A1 | 4/2014 | Morrissey et al. |
| 2014/0223566 A1* | 8/2014 | Zaitsev ............... G06F 21/567 726/24 |
| 2014/0283066 A1 | 9/2014 | Teddy et al. |
| 2015/0074806 A1 | 3/2015 | Roundy et al. |
| 2015/0128263 A1 | 5/2015 | Raugas et al. |
| 2015/0207813 A1 | 7/2015 | Reybok et al. |
| 2015/0372976 A1 | 12/2015 | Lonas et al. |
| 2016/0072836 A1 | 3/2016 | Hadden et al. |
| 2016/0080400 A1 | 3/2016 | Sim et al. |
| 2016/0292419 A1 | 10/2016 | Langton et al. |

OTHER PUBLICATIONS

Kevin Roundy, et al.; Systems and Methods for Determining the Trustworthiness of Files Within Organizations; U.S. Appl. No. 14/753,051, filed Jun. 29, 2015.

Fanglu Guo, et al.; Systems and Methods for Determining Types of Malware Infections on Computing Devices; U.S. Appl. No. 14/947,878, filed Nov. 20, 2015.

"Association rule learning", https://en.wikipedia.org/wiki/Association_rule_learning, as accessed Mar. 2, 2016, Wikipedia, (Apr. 15, 2005).

Lord, Nate, "Common Malware Types: Cybersecurity 101", https://www.veracode.com/blog/2012/10/common-malware-types-cybersecurity-101, as accessed Sep. 21, 2015, VERACODE, (Oct. 12, 2012).

"Probabilistic classification", https://en.wikipedia.org/wiki/Probabilistic_classification, as accessed Sep. 21, 2015, Wikipedia, (Aug. 7, 2014).

"Naive Bayes classifier", https://en.wikipedia.org/wiki/Naive_Bayes_classifier, as accessed Sep. 21, 2015, Wikipedia, (Jan. 31, 2005).

"Managed Security Services", http://www.symantec.com/managed-security-services/, as accessed Sep. 21, 2015, Symantec Corporation, (On or before Sep. 21, 2015).

"Yelp", http://www.yelp.com/, as accessed May 13, 2015, (Nov. 28, 1996).

"Stack Overflow", http://stackoverflow.com/, as accessed May 13, 2015, Stack Exchange Inc., (Mar. 1, 2000).

"ArcSight", http://www8.hp.com/us/en/software-solutions/arcsight-express-siem-appliance/tech-specs.html?jumpid=reg_r1002_usen_c-001_title_r0002, as accessed Apr. 25, 2014, Hewlett-Packard Development Company, L.P., (2014).

Yu, Dong et al., "Alert Confidence Fusion in Intrusion Detection Systems with Extended Dempster-Shafer Theory", http://citeseerx.ist.psu.edu/viewdoc/download;jsessionid=FF6509FDC7A1D361C-A4AFC293FA41159?doi=10.1.1.188.1103&rep=rep1&type=pdf, as accessed Apr. 25, 2014, 43rd ACM Southeast Conference, Kennesaw, GA, USA, (Mar. 18-20, 2005).

Kuang, Liwei (Vivian), "DNIDS: A Dependable Network Intrusion Detection System Using the CSI-KNN Algorithm", https://qspace.library.queensu.ca/bitstream/1974/671/2/Kuang_Liwei_200709_MSc.pdf, as accessed Apr. 25, 2014, A thesis submitted to the School of Computing in conformity with the requirements for the degree of Master of Science, Queen's University, Kingston, Ontario, Canada, (Sep. 2007).

Kevin Alejandro Roundy; Systems and Methods for Estimating Confidence Scores of Unverified Signatures; U.S. Appl. No. 14/307,477, filed Jun. 18, 2014.

Chris Gates, et al; Systems and Methods for Detecting Security Blind Spots; U.S. Appl. No. 15/266,320, filed Sep. 15, 2016.

Chris Gates et al.; Systems and Methods for Personalizing Security Incident Reports; U.S. Appl. No. 15/292,874, filed Oct. 13, 2016.

Suleiman Yerima et al., A New Android Malware Detection Approach Using Bayesian Classification, IEEE, 2013.

Kevin Alejandro Roundy, et al; Systems and Methods for Detecting Security Threats; U.S. Appl. No. 15/084,522, filed Mar. 30, 2016.

* cited by examiner

SYSTEMS AND METHODS FOR DETECTING SECURITY THREATS

BACKGROUND

Individuals and organizations typically seek to protect their computing resources from security threats and corresponding attackers. Accordingly, enterprise organizations may employ conventional security product solutions, such as endpoint antivirus products and network firewall products. In some examples, a security vendor, acting as a managed security service provider, may effectively manage a bundle of security services for a client. More specifically, in some examples, the managed security service provider may aggregate and normalize security incident signatures from a variety of endpoint security products and software security agents, thereby providing a more comprehensive and informative overview of computing resource security and relevant security incidents.

Nevertheless, although a client computing resource may benefit from a multitude of endpoint security products, enterprise organizations may fail to implement one or more of these products on every single client computing resource for a variety of reasons, including cost and limited resource allocation. Accordingly, these client computing resources, which include only a smaller subset of endpoint security products that may be available on other client machines, will not be optimally protected from corresponding security threats. Consequently, the instant disclosure identifies a need for improved systems and methods for detecting security threats.

SUMMARY

As will be described in greater detail below, the instant disclosure describes various systems and methods for detecting security threats by, for example, maintaining a database that records statistical correlations between security incident signatures from one security product and security incident signatures from another, different security product. The database of statistical correlations may enable a security vendor to deduce that a security product would have triggered a security incident signature, even if the security product was not available at the client device, based on a statistical correlation with another security product that was available on the client device and that did trigger a security incident signature, as discussed further below. In one example, a computer-implemented method for detecting security threats may include (1) detecting, by a software security program, a security incident at a client device such that the software security program generates a signature report to identify the security incident, (2) querying an association database with the signature report to deduce another signature report that a different software security program would have predictably generated at the client device, the different software security program having been unavailable at the client device at a time of detecting the security incident, and (3) performing at least one protective action to protect the client device from a security threat associated with the security incident based on the other signature report deduced by querying the association database.

In some examples, the association database may be constructed according to an association rule mining algorithm. The association rule mining algorithm may identify a group of at least two signature reports that occur together beyond a threshold frequency. In further examples, deducing another signature report may include deducing at least two signature reports. In further examples, the method may include filtering at least one signature report of the at least two signature reports based on a determination that the at least one signature report indicates a security compromise. The determination that the at least one signature report indicates a security compromise may include a determination that the signature report is associated disproportionately with security compromise situations according to a statistical measurement. The determination that the at least one signature report indicates a security compromise may also include a determination that an automated measurement of confidence in the signature report indicating a security compromise satisfies a confidence threshold.

In some examples, deducing another signature report may include inferring an attribute of the security incident. The attribute may include at least one of (1) a file identifier for a file that caused the security incident, (2) a uniform resource locator for a web location that caused the security incident, and (3) an Internet Protocol address for a web location that caused the security incident. Additionally, the method may further include measuring a degree of confidence that the inferring of the attribute is correct and then determining that the measured degree of confidence satisfies a confidence threshold.

In one embodiment, a system for implementing the above-described method may include (1) a detection module, stored in memory, that detects, as part of a software security program, a security incident at a client device such that the software security program generates a signature report to identify the security incident, (2) a querying module, stored in memory, that queries an association database with the signature report to deduce another signature report that a different software security program would have predictably generated at the client device, the different software security program having been unavailable at the client device at a time of detecting the security incident, (3) a performance module, stored in memory, that performs at least one protective action to protect the client device from a security threat associated with the security incident based on the other signature report deduced by querying the association database, and (4) at least one physical processor configured to execute the detection module, the querying module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, by a software security program, a security incident at a client device such that the software security program generates a signature report to identify the security incident, (2) query an association database with the signature report to deduce another signature report that a different software security program would have predictably generated at the client device, the different software security program having been unavailable at the client device at a time of detecting the security incident, and (3) perform at least one protective action to protect the client device from a security threat associated with the security incident based on the other signature report deduced by querying the association database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
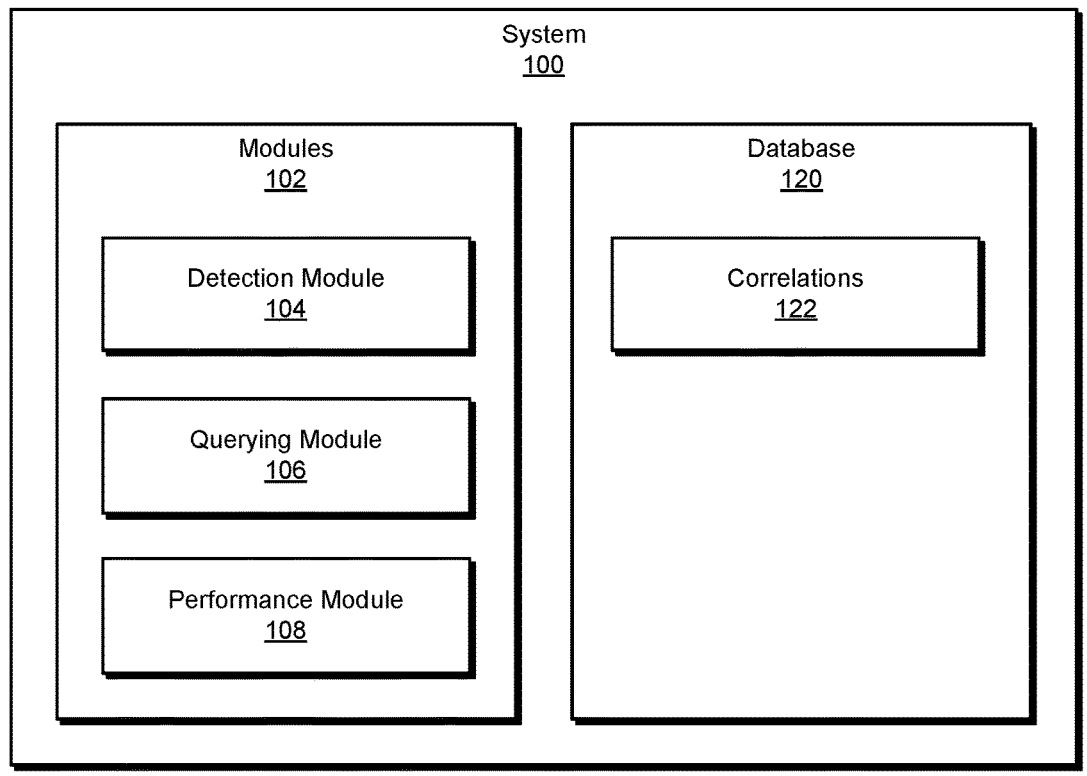
FIG. 1 is a block diagram of an exemplary system for detecting security threats.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting security threats. As will be explained in greater detail below, the disclosed systems and methods may improve the information content and quality of security product reports and notifications. For example, the disclosed systems and methods may enable users to benefit from predictable security product signature reports, even when the corresponding security product was not available or active on an endpoint computing device, as discussed further below.

Figure 2:
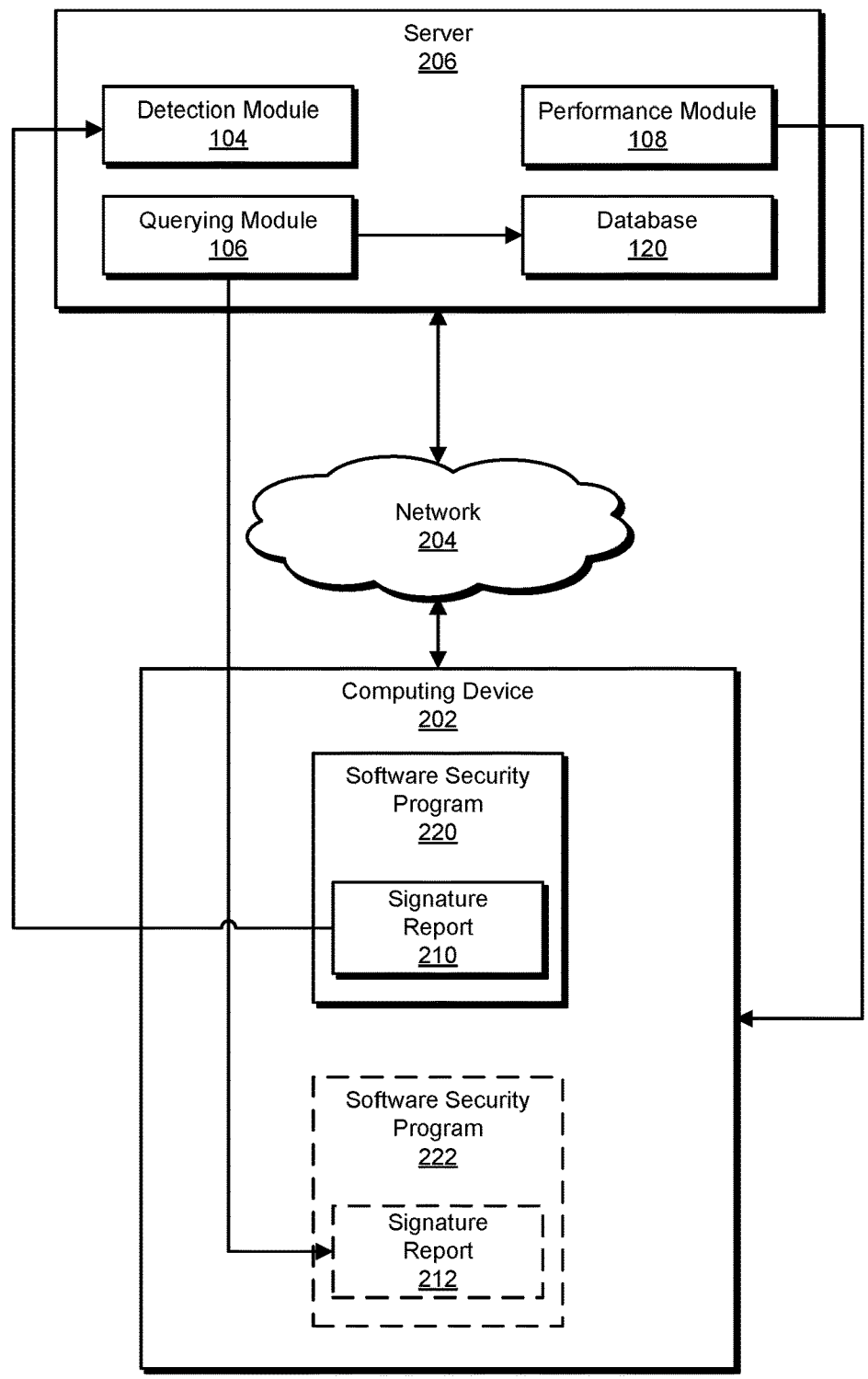
FIG. 2 is a block diagram of an additional exemplary system for detecting security threats.

The following will provide, with reference to FIGS. 1-2, detailed descriptions of exemplary systems for detecting security threats. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting security threats. As illustrated in this figure, exemplary system 100 may include one or more modules 102 for performing one or more tasks. For example, and as will be explained in greater detail below, exemplary system 100 may include a detection module 104 that may detect, as part of a software security program, a security incident at a client device such that the software security program generates a signature report to identify the security incident. Exemplary system 100 may also include a querying module 106 that queries an association database with the signature report to deduce another signature report that a different software security program would have predictably generated at the client device. The different software security program may have been unavailable at the client device at a time of detecting the security incident. Additionally, and as will be described in greater detail below, exemplary system 100 may include a performance module 108 that may perform at least one protective action to protect the client device from a security threat associated with the security incident based on the other signature report deduced by querying the association database. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store correlations 122, which may indicate correlations between signature reports triggered and issued by different software security products and agents. Correlations 122 may enable the disclosed systems and methods to deduce or infer additional signature reports based on the triggering of earlier signature reports, even when the additional signature reports correspond to software security products that were not available or active on the client computing device, as discussed further below.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect security threats. For example, and as will be described in greater detail below, detection module 104 may detect, as part of a software security program 220, a security incident at computing device 202 such that the software security program generates a signature report 210 to identify the security incident. Querying module 106 may query database 120 with signature report 210 to deduce another signature report 212 that a different software security program 222 would have predictably generated at computing device 202. Software security program 222 may have been unavailable at computing device 202 at a time of detecting the security incident. Performance module 108 may perform at least one protective action to protect computing device 202 from a security threat associated with the security incident based on signature report 212 deduced by querying database 120.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating the performance of method 300, as described further below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
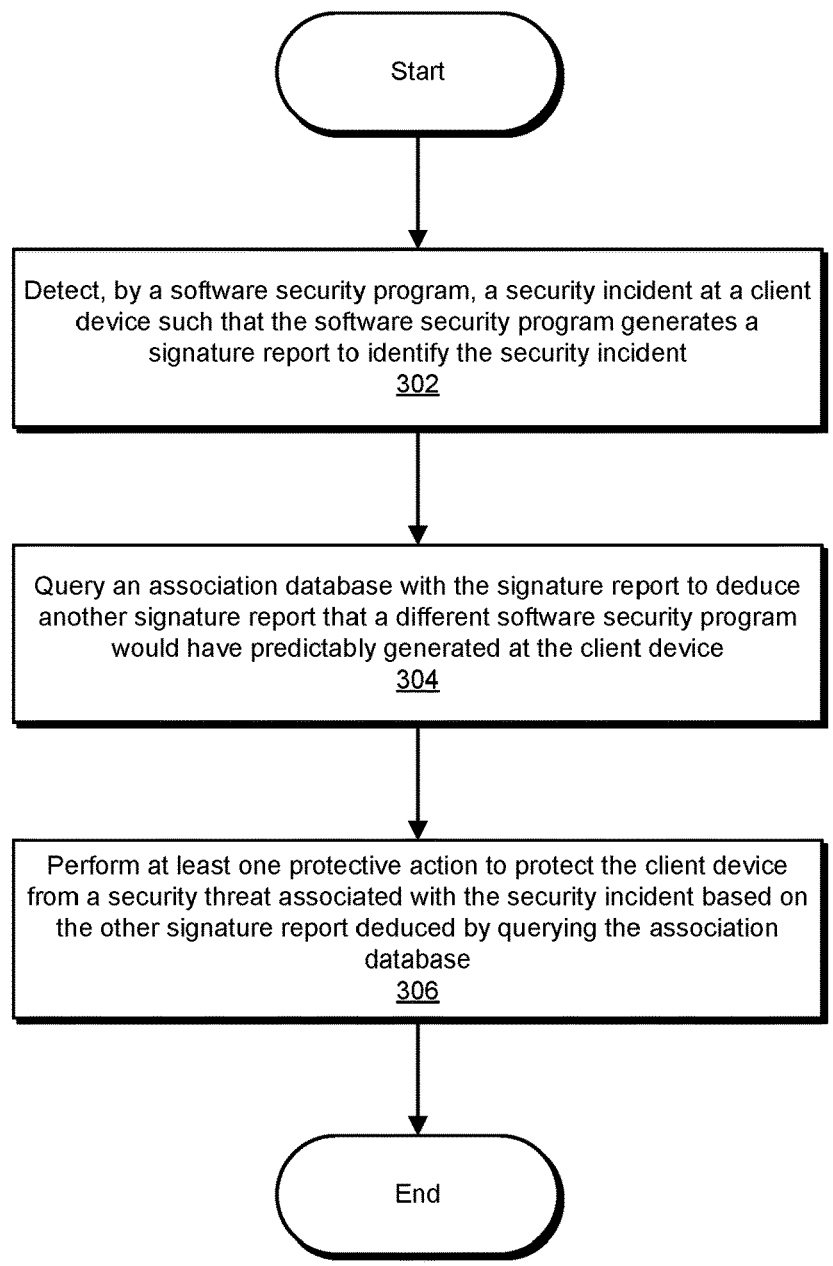
FIG. 3 is a flow diagram of an exemplary method for detecting security threats.

FIG. 3 is a flow diagram of an exemplary computer-implemented method 300 for detecting security threats. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect, through a software security program, a security incident at a client device such that the software security program generates a signature report to identify the security incident. For example, detection module 104 may, as part of server 206 in FIG. 2, detect a security incident at computing device 202 such that software security program 220 generates signature report 210 to identify the security incident.

As used herein, the term "security incident" generally refers to any event detected by a corresponding software security program that is configured to detect the event as a candidate security threat or otherwise investigate suspicious computing activity. Furthermore, as used herein, the term "signature report" generally refers to any identifier or string of characters that the software security program uses to distinguish the detected security incident from other identified types, categories, and/or species of security incidents.

Detection module 104 may detect the security incident in a variety of ways. For example, detection module 104 may, as part of server 206, receive a report from a client-side security agent (e.g., software security program 220), indicating that a signature at the corresponding client device was triggered. Additionally, or alternatively, detection module 104 may, as part of computing device 202, directly detect the presence of the security incident at computing device 202. Detection module 104 may detect the security incident through any suitable technique for monitoring and/or identifying an event, attribute, process, file, network packet, activity, or other feature that indicates a security incident or candidate security threat. For example, detection module 104 may continuously, or according to a predetermined schedule, monitor for the presence of one or more of these features, which may be scanned to determine whether they match one or more corresponding signature sets or patterns. Upon detecting that any identified event, attribute, process, file, network packet, activity, or other feature matches a predetermined signature set, detection module 104 may detect the corresponding security incident and generate the corresponding signature report.

Returning to FIG. 3, at step 304 one or more of the systems described herein may query an association database with the signature report to deduce another signature report that a different software security program would have predictably generated at the client device. The different software security program may have been unavailable at the client device at a time of detecting the security incident. For example, querying module 106 may, as part of server 206 in FIG. 2, query database 120 with signature report 210 to deduce another signature report 212 that a different software security program would have predictably generated at computing device 202.

As used herein, the phrase "query an association database with the signature report" generally refers broadly to analyzing content of the association database based on the signature report (e.g., to deduce other correlated or associated signature reports). Similarly, the phrase "would have predictably generated" generally refers to an inference that the different software security product, if the software security product had been available and active at the client device, would have triggered its signature report (i.e., signature report 212), based on the correlation or association of the signature report with the original, actually detected signature report (i.e., signature report 210). Additionally, the phrase "unavailable at the client device" generally refers to the different software security product being absent from the client device or, even if the software security product was present, the software security product was deactivated or otherwise not functioning.

Querying module 106 may query the association database in a variety of ways. In some examples, the association database may be constructed according to an association rule mining algorithm. As used herein, the term "association rule mining algorithm" generally refers to any technique for deriving rules beyond a threshold level of confidence for support that indicate correlations or co-occurrence rates between signature reports from different software security products or agents, in a manner that is suitable for the intended functionality of method 300. As one illustrative example, the term "association rule mining algorithm" may be defined in accordance with the definition set forth in the Wikipedia article for "association rule mining" which is incorporated herein by reference in its entirety (https://en.wikipedia.org/wiki/Association_rule_learning) (accessed 21 Mar. 2016). In general, the association rule mining algorithm may function to identify a group of at least two signature reports that occur together beyond a threshold frequency.

Moreover, in some examples, querying module 106 may deduce signature report 212 by deducing at least two signature reports. Furthermore, querying module 106 may filter at least one signature report of the at least two signature reports based on a determination that the at least one signature report indicates a security compromise. In some examples, the determination that the at least one signature report indicates a security compromise may include a determination that the signature report is associated disproportionately with security compromise situations according to a statistical measurement. In further examples, the determination that the at least one signature report indicates a security compromise may include a determination that an automated measurement of confidence in the signature report indicating a security compromise satisfies a confidence threshold.

In some examples, querying module 106 may deduce signature report 212 at least in part by inferring an attribute of the security incident. The attribute may include at least one of (1) a file identifier for a file that caused the security incident (or is otherwise associated with the security incident), (2) a uniform resource locator for a web location that caused the security incident (or is otherwise associated with the security incident), and/or (3) an Internet Protocol address for a web location that caused the security incident (or is otherwise associated with the security incident). Querying module 106 may accordingly populate one or more fields of a signature report, or other notification, with these inferred attributes to thereby improve the quality or quantity of information provided by the signature report. Querying module 106 may alternatively or additionally infer any other attribute of a security incident that may provide further context for the signature report or otherwise improve the information quality and insightfulness of the signature report and associated protective security measures. Additionally, in some examples, querying module 106 may further measure a degree of confidence that the inferring of the attribute is correct and determine that the measured degree of confidence satisfies a confidence threshold. Accordingly, querying module 106 may ensure that inferred attributes are only used or reported when there is a relatively high degree of confidence that the corresponding inference is correct.

Figure 4:
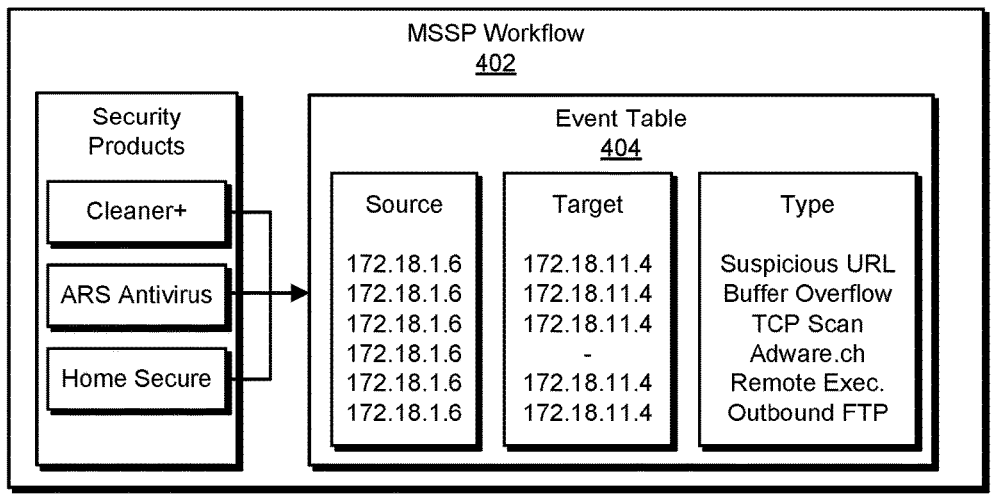
FIG. 4 is a block diagram of exemplary signature reports related to systems and methods for detecting security threats.
Figure 4:
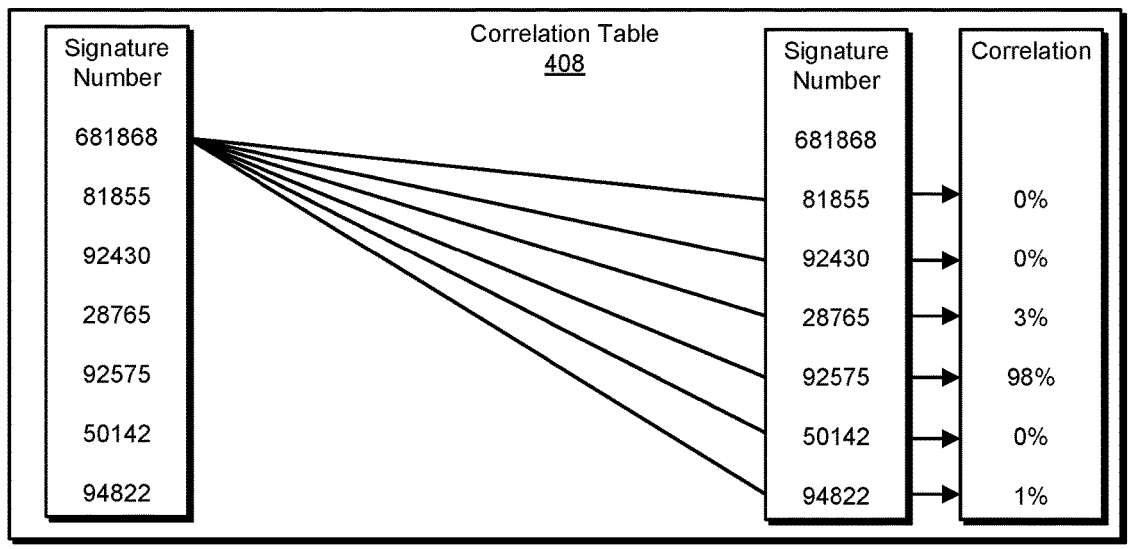

In the example of FIG. 4, a managed security service provider ("MSSP") may function according to a MSSP workflow 402, which is illustrated in the figure. As further shown in this figure, MSSP workflow 402 may aggregate and/or normalize signature reports, or other notifications, that are issued by multiple different security products or programs (e.g., different versions or brands of software security products). Notably, the security products listed within this figure are fictitious. The signature reports, or other notifications, may be aggregated and/or normalized into an event table 404, which may further specify a source of a security incident, a target of a security incident, and/or a type of the security incident.

FIG. 4 further shows a summary table 406, which lists a signature number, a machine count, a sum, and a signature name for corresponding signature reports or other notifications issued by corresponding software security programs, as outlined above. Notably, some of the signature names and reports maybe more informative than others. For example, signature number 681868 simply has the name "ASA-6-605: Misc. Unknown IP" which is relatively obscure and uninformative. In contrast, signature number 92575 has the name "Worm2.exe Targeted PW Exploit" which is far more detailed and specific, and therefore more informative and helpful to the user or customer. Specifically, the signature name indicates that the security incident is associated with a specific species of known malware, using a specific type of executable file ("Worm2.exe") to exploit or compromise a password ("PW") in a targeted attack ("Targeted") as distinct from a non-targeted or indiscriminate general population attack. Accordingly, signature number 92575 provides far more detailed, insightful, and helpful information than signature number 681868.

FIG. 4 additionally shows a correlation table 408, which further illustrates correlations or co-occurrence rates between signature numbers listed within summary table 406. For simplicity and ease of discussion, and due to the space restriction within FIG. 4, correlation table 408 only shows the correlations between signature number 681868 and the remaining signature numbers within summary table 406. Nevertheless, the reader may readily understand that correlation table 408 may further include any other correlations between signature numbers listed within summary table 406, even if signature number 681868 is not involved in each correlation.

As further shown in this figure, signature number 681868 has a correlation rate of zero, or close to zero, with every other signature number, except for signature number 92575, which has a correlation rate of 98%. The relatively high correlation rate of 98%, which may satisfy an arbitrary or predefined statistical measurement of confidence or validity (e.g., greater than 90% correlation), strongly indicates that signature number 681868 and signature number 92575 are related to each other as part of the same security threat or attack. In other words, correlation table 408 strongly indicates that the relatively obscure and uninformative signature number 681868 is further associated with the far more detailed and informative signature number 92575. Accordingly, if a user or customer used a specific software security product on a client machine that generated signature number 681868, without also using a different software security product that would have predictably generated signature number 92575, then the user or customer would not have previously benefited from the generation of signature number 92575. Nevertheless, the disclosed systems and methods may overcome the problems associated with these situations by identifying correlations, such as the correlations in correlation table 408, and using these correlations to supplement or improve the signature report associated with signature number 681868 such that the user or customer may benefit from the hypothetical or predicted triggering of signature number 92575, even if the user or customer had not activated the different software security product associated with signature number 92575 on the client device.

Returning to FIG. 3, at step 306 one or more of the systems described herein may perform at least one protective action to protect the client device from a security threat associated with the security incident based on the other signature report deduced by querying the association database. For example, performance module 108 may, as part of server 206 in FIG. 2, perform at least one protective action to protect computing device 202 from a security threat associated with the security incident based on signature report 212 deduced by querying database 120.

As used herein, the term "protective action" generally refers to any suitable action that a software security product and/or security vendor may perform to protect a client device from a corresponding security threat, in accordance with method 300. Examples of suitable protective actions may include modifying, revising, and/or improving a security incident report (e.g., by revising or supplementing the security incident report to include information about signature report 212), notifying a user or administrator, and/or automatically performing (and/or prompting a user or administrator to perform) a remedial action such as updating an antivirus signature set, executing one or more cleaning or inoculation scripts or programs, enabling, heightening, and/or strengthening one or more security measures, settings, and/or features, and/or disabling, quarantining, sandboxing, and/or powering down one or more software, hardware, virtual, and/or network computing resources (e.g., where one or more of these protective actions are specifically prescribed and/or tailored to signature report 210 and/or signature report 212).

Performance module 108 may perform the protective action in a variety of ways. In general, performance module 108 may perform the protective action by supplementing or improving a security incident report with information derived from deducing signature report 212, as discussed above. Accordingly, performance module 108 may improve the information quality and quantity of a security incident report, or other notification, by supplementing the security incident report with information associated with a "phantom event" that was deduced or inferred according to step 304 of method 300. The supplemented information may also enable performance module 108 to perform additional remedial actions, such as those listed above, which are more specifically tailored to address the more specifically identified security threat associated with signature report 212.

The above discussion of FIG. 3 provides a comprehensive description of various systems and methods disclosed herein. Additionally, the following discussion provides additional details about further embodiments.

Managed security service provider ("MSSP") incident detection is challenging because each customer deploys a set of security products. One particular brand of firewall indicators of compromise may be indicative of a particular botnet that an endpoint security agent always identifies when the endpoint security agent is deployed on the client device, but when the endpoint security agent is not deployed, the meaning of the firewall indicator of compromise may be highly unclear, resulting in inaction by the customer when presented with the incomplete evidence. The disclosed systems and methods improve the customer's ability to understand the incident by inferring that useful "phantom events" (i.e., from a hypothetical endpoint security agent that was not actually present and active at the time of the actual and original indicator of compromise) would have triggered if the hypothetical endpoint security agent or product had been available and active on the client.

By inferring missing events as additional context for security incidents, the disclosed systems and methods provide context that additional security agents and products would deliver in many cases. One goal is to identify which signatures generated by a first security product in a security incident scenario strongly imply the presence of a particular set of signatures generated by a second, different product, whenever the two products are deployed alongside each other in a customer environment. When a customer deploys the first product in the absence of the second product, and the first product detects a security incident, the systems and methods can include the second product's strongly implied signatures as "phantom events," to provide additional context for the security incident. The second product's implied signatures may be "strongly implied" in the sense that they satisfy a statistical threshold of correlation with the first product's signature that actually triggered.

There are multiple possible methods for identifying phantom events. In one embodiment, association rule mining may identify the phantom events. Association rule mining may proceed by identifying frequent groups of signatures that frequently occur together (i.e., according to a statistical threshold). In one embodiment, the systems and methods compute frequent groups of signatures for the purposes of generating phantom signals between two products when the two products are deployed together in a particular customer environment. Once a group of signatures that spans the two products have been identified, the systems and methods measure the support of rules between signatures from the two products (e.g., according to the association rule mining). The systems and methods may also determine the support for one or more of the association rule mining rules (e.g., the proportion of the time that the rules apply).

In some examples, the systems and methods may selectively filter phantom events such that only certain phantom events are reported or acted on. For example, some phantom events may be more indicative of a security compromise than other phantom events. In general, some phantom events may be more valuable, in terms of information quality and insight, than other phantom events. The systems and methods may identify higher value phantom events through the following mechanisms: (1) including phantom events that have been manually identified as high severity or high confidence, (2) determining which phantom events (or event types) fire disproportionately in security compromise situations as opposed to non-security-compromise situations (i.e., false positives), and (3) using a security vendor's confidence scores that identify signatures that always, or nearly always (according to a statistical threshold), occur in conjunction with more severe signatures that indicate a true security compromise.

Additionally, the systems and methods may automatically populate attributes for phantom events. The systems and methods can infer the attributes of a phantom event. The systems and methods may also identify the event type such as the most probable action associated with the event (e.g., not blocked, blocked, quarantined). Additional fields that may be possible to infer include files involved, uniform resource locators, Internet protocol addresses, etc. In some examples, the systems and methods would only include these further attributes if they can be inferred with a high degree of certainty according to a statistical measurement and threshold.

The systems and methods thereby help managed security service customers better understand signatures that the managed security service provider (and associated software) detect. The systems and methods also increase the probability that the customers will act on these detections. The systems and methods are also useful as a mechanism to show customers what they could expect to gain from a real deployment of an additional security product (e.g., deployed from the managed security service provider).

Figure 5:
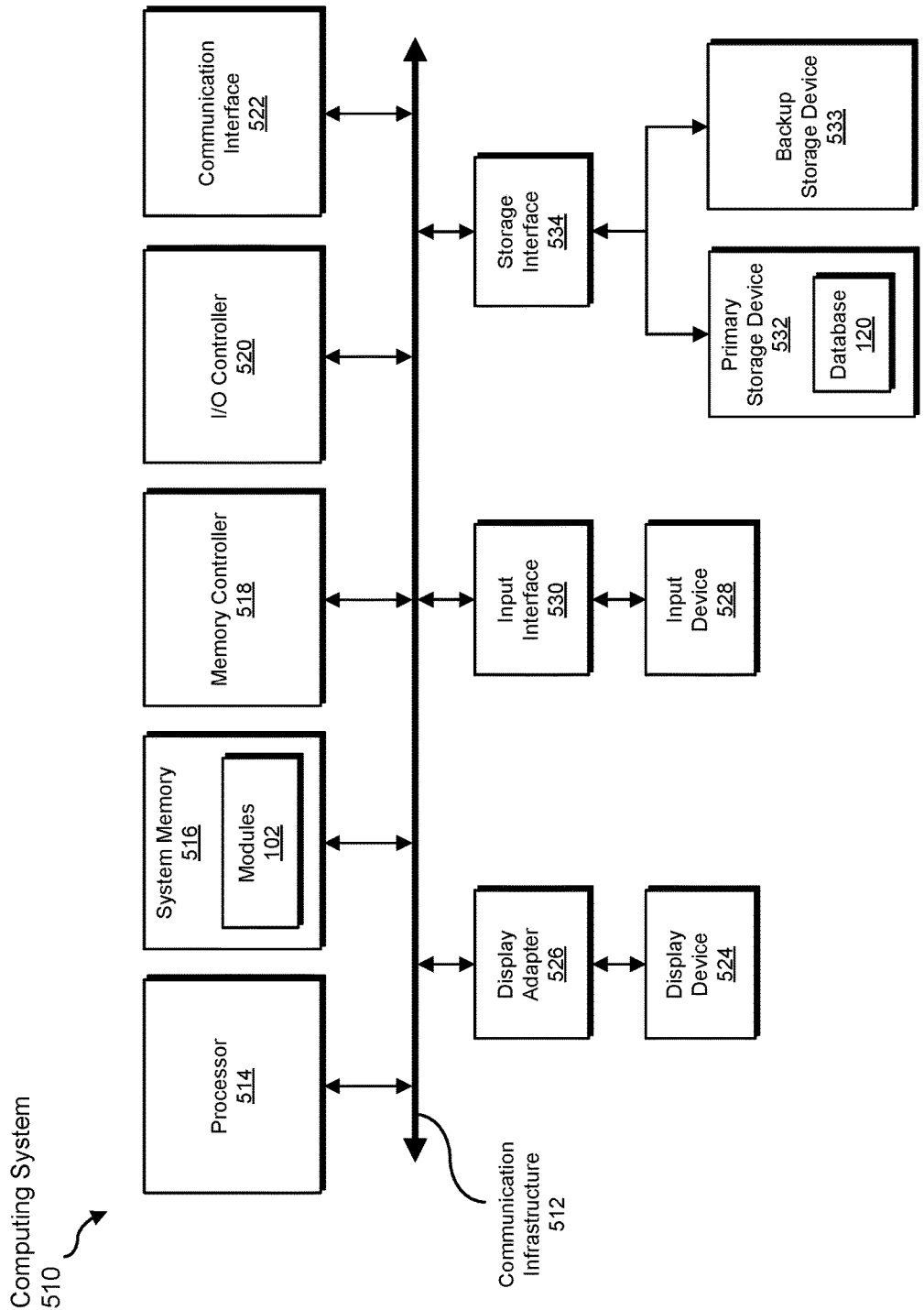
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
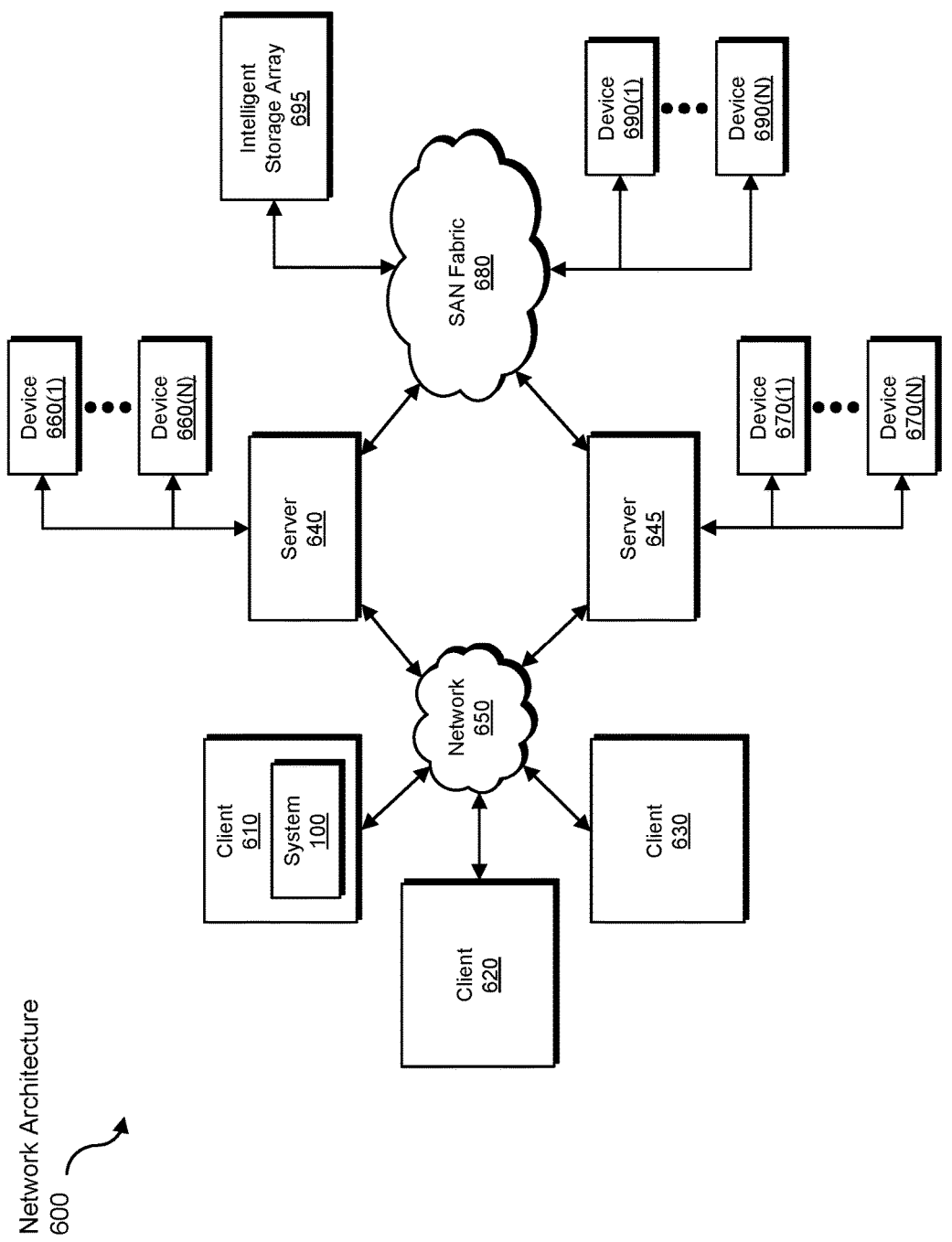
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security threats, at least a portion of the method being performed by a computing device comprising at least one processor, the method comprising:
    detecting, by a software security product, a security incident at a client device such that the software security product generates a signature report to identify the security incident;
    querying an association database with the signature report to deduce another signature report that a different software security product would have predictably generated at the client device, the different software security product having been unavailable at the client device at a time of detecting the security incident; and
    performing at least one protective action to protect the client device from a security threat associated with the security incident based on the other signature report deduced by querying the association database, wherein:
    the protective action comprises:
        revising a security incident report to include information about the other signature report as a phantom event to provide context for the security incident; and
        prompting a user to perform an action that is tailored to the other signature report, the action comprising at least one of:
            updating an antivirus signature set;
            executing an inoculation script;
            enabling a security setting; and
            disabling a hardware, virtual, and/or network computing resource; and
    the other signature report satisfies a statistical threshold of correlation with the signature report that was actually generated.

2. The computer-implemented method of claim 1, wherein the association database is constructed according to an association rule mining algorithm.

3. The computer-implemented method of claim 2, wherein the association rule mining algorithm identifies a group of at least two signature reports that occur together beyond a threshold frequency.

4. The computer-implemented method of claim 1, wherein deducing the other signature report comprises deducing at least two signature reports.

5. The computer-implemented method of claim 4, further comprising filtering at least one signature report of the at least two signature reports based on a determination that the at least one signature report indicates a security compromise.

6. The computer-implemented method of claim 5, wherein the determination that the at least one signature report indicates a security compromise comprises a determination that the signature report is associated disproportionately with security compromise situations according to a statistical measurement.

7. The computer-implemented method of claim 5, wherein the determination that the at least one signature report indicates a security compromise comprises a determination that an automated measurement of confidence in the signature report indicating a security compromise satisfies a confidence threshold.

8. The computer-implemented method of claim 1, wherein deducing the other signature report comprises inferring an attribute of the security incident.

9. The computer-implemented method of claim 8, wherein the attribute comprises at least one of:
    a file identifier for a file that caused the security incident;
    a uniform resource locator for a web location that caused the security incident; and
    an Internet Protocol address for a web location that caused the security incident.

10. The computer-implemented method of claim 8, further comprising:
    measuring a degree of confidence that the inferring of the attribute is correct; and
    determining that the measured degree of confidence satisfies a confidence threshold.

11. A system for detecting security threats, the system comprising:
    a detection module, stored in memory, that detects, as part of a software security product, a security incident at a client device such that the software security product generates a signature report to identify the security incident;
    a querying module, stored in memory, that queries an association database with the signature report to deduce another signature report that a different software security product would have predictably generated at the client device, the different software security product having been unavailable at the client device at a time of detecting the security incident;
    a performance module, stored in memory, that performs at least one protective action to protect the client device from a security threat associated with the security incident based on the other signature report deduced by querying the association database; and at least one physical processor configured to execute the detection module, the querying module, and the performance module, wherein:

the protective action comprises:

revising a security incident report to include information about the other signature report as a phantom event to provide context for the security incident; and prompting a user to perform an action that is tailored to the other signature report, the action comprising at least one of:

updating an antivirus signature set;

executing an inoculation script;

enabling a security setting; and disabling a hardware, virtual, and/or network computing resource; and the other signature report satisfies a statistical threshold of correlation with the signature report that was actually generated.

12. The system of claim 11, wherein the association database is constructed according to an association rule mining algorithm.

13. The system of claim 12, wherein the association rule mining algorithm identifies a group of at least two signature reports that occur together beyond a threshold frequency.

14. The system of claim 11, wherein the querying module deduces the other signature report by deducing at least two signature reports.

15. The system of claim 14, wherein the querying module filters at least one signature report of the at least two signature reports based on a determination that the at least one signature report indicates a security compromise.

16. The system of claim 15, wherein the determination that the at least one signature report indicates a security compromise comprises a determination that the signature report is associated disproportionately with security compromise situations according to a statistical measurement.

17. The system of claim 15, wherein the determination that the at least one signature report indicates a security compromise comprises a determination that an automated measurement of confidence in the signature report indicating a security compromise satisfies a confidence threshold.

18. The system of claim 11, wherein the querying module deduces the other signature report by inferring an attribute of the security incident.

19. The system of claim 18, wherein the attribute comprises at least one of:

a file identifier for a file that caused the security incident;

a uniform resource locator for a web location that caused the security incident; and an Internet Protocol address for a web location that caused the security incident.

20. A non-transitory computer-readable medium comprising one or more computer-executable instructions that, when executed by at least one processor of a computing device, cause the computing device to:

detect, by a software security product, a security incident at a client device such that the software security product generates a signature report to identify the security incident;

query an association database with the signature report to deduce another signature report that a different software security product would have predictably generated at the client device, the different software security product having been unavailable at the client device at a time of detecting the security incident; and perform at least one protective action to protect the client device from a security threat associated with the security incident based on the other signature report deduced by querying the association database, wherein:

the protective action comprises:

revising a security incident report to include information about the other signature report as a phantom event to provide context for the security incident; and prompting a user to perform an action that is tailored to the other signature report, the action comprising at least one of:

updating an antivirus signature set;

executing an inoculation script;

enabling a security setting; and disabling a hardware, virtual, and/or network computing resource; and the other signature report satisfies a statistical threshold of correlation with the signature report that was actually generated.

* * * * *